(12) United States Patent
Hayashi (10) Patent No.: US 6,522,468 B2
(45) Date of Patent: *Feb. 18, 2003

(54) LIGHT-POLARIZING FILM

(75) Inventor: Narutoshi Hayashi, Toyonaka (JP)

(73) Assignee: Sumitomo Chemical Company, Limited, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 61 days.

(21) Appl. No.: 09/398,827

(22) Filed: Sep. 17, 1999

(65) Prior Publication Data

US 2001/0040652 A1 Nov. 15, 2001

(30) Foreign Application Priority Data

| Mar. 18, 1999 | (JP) | ............................................. 11-073665 |
| Mar. 18, 1999 | (JP) | ............................................. 11-073666 |
| Mar. 23, 1999 | (JP) | ............................................. 11-077619 |

(51) Int. Cl.[7] .............................. G02B 5/30; F21V 9/14
(52) U.S. Cl. ........................ 359/491; 359/483; 359/490; 359/492; 359/502; 252/585
(58) Field of Search .................................. 359/490, 491, 359/492, 494, 500, 502, 483, 485; 252/585; 353/20; 349/5, 9, 96, 97; 264/1.34, 1.35

(56) References Cited

U.S. PATENT DOCUMENTS

| 4,917,465 A | * | 4/1990 | Conner et al. .................. 349/5 |
| 5,007,942 A | * | 4/1991 | Claussen et al. ............. 359/491 |
| 5,071,906 A | * | 12/1991 | Tanaka et al. ............... 524/557 |
| 5,272,259 A | * | 12/1993 | Claussen et al. ............. 252/585 |
| 5,310,509 A | * | 5/1994 | Okada et al. ................. 252/585 |
| 5,354,512 A | * | 10/1994 | Ogino et al. ................. 252/585 |
| 5,548,073 A | * | 8/1996 | Misawa et al. .............. 534/690 |
| 5,609,796 A | * | 3/1997 | Yamamoto et al. .......... 252/585 |
| 5,670,092 A | * | 9/1997 | Starzewski ................... 252/585 |
| 5,698,680 A | * | 12/1997 | Matsuzaki et al. ........... 534/690 |
| 5,925,289 A | * | 7/1999 | Cael et al. .................... 359/490 |

FOREIGN PATENT DOCUMENTS

| DE | 0256500 | * | 5/1988 | .................. 359/490 |
| DE | 4406426 A1 | * | 8/1995 | |
| EP | 531569 A | * | 3/1993 | .................. 359/490 |
| JP | 58-68008 A | * | 4/1983 | |
| JP | 58-124621 A | * | 7/1983 | |
| JP | 10-39138 | | 2/1998 | |
| JP | 10-39139 | | 2/1998 | |
| WO | WO 96/07941 | * | 3/1996 | |

* cited by examiner

*Primary Examiner*—John Juba, Jr.
(74) *Attorney, Agent, or Firm*—Sughrue Mion, PLLC (57) ABSTRACT

A light-polarizing film is provided which possesses a light transmittance of not more than 0.3% at wavelengths of from 430 nm to 500 nm inclusive when irradiated with a linearly polarized light with a vibration plane parallel to an absorption axis of said film, and a light transmittance of not less than 77% at wavelengths of from 430 nm to 500 nm inclusive when irradiated with a linearly polarized light with a vibration plane perpendicular to the absorption axis of said film. When a light-polarizing plate comprising the light-polarizing film is applied to the liquid crystal panel for blue of a liquid crystal projector, the obtained liquid crystal projector displays images featuring bright and 15 natural color tones.

2 Claims, 5 Drawing Sheets

LIGHT-POLARIZING FILM

FIELD OF THE INVENTION

The present invention relates to a light-polarizing film.

BACKGROUND OF THE INVENTION

In conventional liquid crystal projectors incorporating liquid crystal panels, such as so-called video projectors, data projectors and the like, beams of the three primary colors of red (R), green (G) and blue (B) are respectively applied to liquid crystal panels for red, green and blue to obtain respective images of the three primary colors. The resultant images are synthesized and projected by means of dichroic mirrors or the like. The beam of each primary color is obtained through spectral-separation of white light from a metal halide lamp, high-pressure mercury lamp or the like, by means of the dichroic mirror or the like. Such a liquid crystal panel normally employs a light-polarizing plate wherein protective sheet(s) are bonded to one or both sides of a so-called neutral-gray light-polarizing film. As the light-polarizing film, a light-polarizing film with an absorbedly oriented dichroic dye is frequently employed in view of its resistance to heat and light from the light source.

Unfortunately, a conventional liquid crystal projector with the neutral-gray light-polarizing film has a problem in that a displayed image often appears yellowish to the eye. The problem of the yellowish image display may be solved by reducing the amount of light for red and green relative to that for blue. However, the reduced amount of light results in a lowered image lightness.

SUMMARY AND OBJECT OF THE INVENTION

After an intensive study to develop a light-polarizing film for a liquid crystal projector featuring a bright and natural color display, the present inventors have found that a bright and natural color display is attained by applying a light-polarizing plate comprising a light-polarizing film with specific light transmitting characteristics to the liquid crystal panel for blue of the liquid crystal projector, thus achieving the present invention.

A first object of the present invention is to provide a light-polarizing film which possesses a light transmittance of not more than 0.3% at wavelengths of from 430 nm to 500 nm inclusive when irradiated with a linearly polarized light with a vibration plane parallel to an absorption axis and a light transmittance of not less than 77% at wavelengths of from 430 nm to 500 nm inclusive when irradiated with a linearly polarized light with a vibration plane perpendicular to the absorption axis.

A second object of the present invention is to provide a light-polarizing plate which comprises the above-described light-polarizing film and possesses a surface reflectance of not more than 1% at wavelengths of from 430 nm to 500 nm inclusive.

A third object of the present invention is to provide a light-polarizing plate which possesses a light transmittance of not more than 0.3% at wavelengths of from 430 nm to 500 nm inclusive when irradiated with the linearly polarized light with the vibration plane parallel to the absorption axis, a light transmittance of not less than 77% at wavelengths of from 430 nm to 500 nm inclusive when irradiated with the linearly polarized light with the vibration plane perpendicular to the absorption axis, and a surface reflectance of not more than 1% at wavelengths of from 430 nm to 500 nm inclusive.

DETAIL DESCRIPTION OF THE INVENTION

A light-polarizing film in the present invention possesses a light transmittance of not more than 0.3% at wavelengths of from 430 nm to 500 nm inclusive when irradiated with a linearly polarized light with a vibration plane parallel to an absorption axis of the film. With the light transmittance of over 0.3%, a tendency exists that a sufficient contrast effect of a display screen cannot be attained. The light transmittance is preferably in the range of more than 0% and less than 0.3%, and more preferably in the range of more than 0% and not more than 0.1%.

In a case where the light-polarizing film has a protective sheet or an antireflective layer placed thereon for use as a light-polarizing plate, such a light-polarizing plate may possess a light transmittance of not more than 0.3% at wavelengths of from 430 nm to 500 nm inclusive when irradiated with the linearly polarized light with the vibration plane parallel to the absorption axis of the film.

The light-polarizing film in the present invention possesses a light transmittance of not less than 77% at wavelengths of from 430 nm to 500 nm inclusive when irradiated with the linearly polarized light with the vibration plane perpendicular to the absorption axis of the film. With the light transmittance of below 77%, the display screen tends to appear yellowish to the eye. The light transmittance is preferably in the range of not less than 80% and less than 100%.

In the case where the light-polarizing film has the protective sheet or the antireflective layer placed thereon for use as the light-polarizing plate, the light-polarizing plate may possess a light transmittance of not less than 77% at wavelengths of from 430 nm to 500 nm inclusive when irradiated with the linearly polarized light with the vibration plane perpendicular to the absorption axis of the film.

It is noted that the direction perpendicular to the absorption axis of the light-polarizing film coincides with a direction to a transmission axis of the film and, therefore, the linearly polarized light with the vibration plane perpendicular to the absorption axis of the film is equivalent to a linearly polarized light with the vibration plane parallel to the transmission axis of the film.

The light-polarizing film of the present invention may be obtained by allowing, for example, a polyvinyl alcohol resin film to absorb a dichroic dye in an oriented manner.

Examples of the polyvinyl alcohol resin film include a film of polyvinyl acetate; a film of a copolymer of vinyl acetate and another monomer copolymerizable therewith, such as of vinyl acetate with an unsaturated carboxylate, an olefin, a vinyl ether, an unsaturated sulfonate or the like; the above-described films subjected to saponification treatment; polyvinyl formal films and polyvinyl acetal films obtained by modifying the above-mentioned resins and the like. In the case of the saponificated film, a saponification degree thereof is normally at 80 to 100 mol % and preferably at 98 to 100 mol %. In the polyvinyl alcohol resin film, a polymerization degree of the polyvinyl alcohol resin is normally not less than about 1,000 and not more than about 10,000. Preferably, the polymerization degree is about 1,500 to about 5,000 and more preferably about 2,000 to about 5,000.

Although not particularly limited, the polyvinyl alcohol resin film may have, for example, a thickness of about 50 $\mu$m to about 150 $\mu$m.

The present invention may employ a known dichroic dye, which is selected from the group consisting of, for example,:

a dichroic dye represented in the form of free acid by the following general formula (I) (hereinafter referred to as "dichroic dye A"), (I)

wherein Me denotes a transition metal selected from copper, nickel, zinc and iron; $A^1$ denotes an unsubstituted or substituted phenyl or naphthyl group: $B^1$ denotes an unsubstituted or substituted 1-naphthol or 2-natphthol group which is bonded to an azo group at a position adjoining a hydroxyl group forming complex with the transition metal represented by Me; and $R^1$ and $R^2$ each independently denote a hydrogen atom, a lower alkyl group having 1 to 4 carbon atoms, a lower alkoxy group, a carboxyl group, a sulfo group, a sulfonamide group, a sulfonalkylamide group, an amino group, an acylamino group, a halogen atom or a nitro group;

a dichroic dye represented in the form of free acid by the following general formula (II) (hereinafter referred to as "dichroic dye B"), (II)

wherein $A^3$ and $B^3$ each independently denote an unsubstituted or substituted phenyl or naphthyl group; $R^3$ and $R^4$ each independently denote a hydrogen atom, a lower alkyl group having 1 to 4 carbon atoms, a lower alkoxy group, a carboxyl group, a sulfo group, a sulfonamide group, a sulfonalkylamide group, an amino group, an acylamino group, a halogen atom, or a nitro group; and m denotes an integer of 0 or 1;

a dichroic dye represented in the form of free acid by the following general formula (III) (hereinafter referred to as "dichroic dye C"), (III)

wherein $Q^1$ and $Q^4$ each independently denote an unsubstituted or substituted phenyl or naphthyl group; $Q^2$ and $Q^3$ each independently denote an unsubstituted or substituted phenylene; and X denotes —N=N— or —N(→O)=N—, provided that when X is —N=N— and $Q^2$ and $Q^3$ are both unsubstituted phenylenes, at least one of $Q^1$ and $Q^4$ is neither a phenyl group that has an alkyl-substituted amino group and is not substituted with an additional group, nor a phenyl group that has an alkyl-substituted amino group and is further substituted with methyl;

a dichroic dye represented by the following general formula (IV) (hereinafter referred to as "dichroic dye D"):

(IV)

wherein Me denotes a transition metal selected from copper, nickel, zinc and iron; $Q^5$ and $Q^6$ each independently denote an unsubstituted or substituted 1-naphthol or 2-naphthol residue, the naphthol residue having a hydroxy which is in a position adjoining the azo group and forming a complex with the transition metal represented by Me; Y denotes —N=N— or —N(→O)=N—; and $R^5$ and $R^6$ each independently denote a hydrogen atom, a lower alkyl group, a lower alkoxy group or a sulfo group, and a dichroic dye (hereinafter referred to as "dichroic dye E") selected from the group consisting of C.I. Direct Yellow 12, C.I. Direct Red 31, C.I. Direct Yellow 44, C.I. Direct Yellow 28, C.I. Direct Orange 107, C.I. Direct Red 79, C.I. Direct Red 2, C.I. Direct Red 81, C.I. Direct Orange 26, C.I. Direct Orange 39, C.I. Direct Red 247, C.I. Direct Yellow 142 and C.I. Direct Red 28.

In the dichroic dye A, a copper atom is preferred as Me of the general formula (I). In the dichroic dye D, a copper atom is preferred as Me of the general formula (IV).

Such dichroic dyes A to E (provided that the dichroic dyes D and E are limited to those having the sulfo group) are all usually used mainly in the form of an alkali metal salt and particularly in the form of a sodium salt. However, these dyes may be used in the form of lithium salt, kalium salt or the like, or in the form of the free acid. Alternatively, the dyes may also be used in the form of an amine salt such as ammonium salt, ethanolamine salt and alkylamine salt.

The dichroic dyes A to E may all be obtained by the known methods. For example, the dichroic dye A can be obtained by the method set forth in, for instance, West Germany Laid-Open Patent Unexamined Publication No.3236238-A, Japanese Patent Publication No.64-5623-B or the like. The dichroic dye B can be obtained by the method set forth in, for instance, Japanese Laid-Open Patent Unexamined Publication No.2-75672-A or the like. The dichroic dyes C and D can be obtained by the method set forth in, for example, Ind. Eng. Chem., 27,1045 (1935), J. Am. Chem. Soc., 73,1323 (1951) or the like. The dichroic dye E is disclosed in, for example, "Dye Handbook(1st edition)(1970)".

In the production of the light-polarizing film of the present invention, the dichroic dyes may be used alone, respectively, or in combination of two or more types. When the dyes are used in combination of two or more types, the combination thereof may be made by selecting dyes from one group or different groups of the five dichroic dye groups A to E or selecting a dye from other than the five groups.

Among them, a preferred combination comprises that of C.I. Direct Orange 39 and C.I. Direct Red 81; C.I. Direct Orange 39 and C.I. Direct Red 2; C.I. Direct Orange 39 and C.I. Direct Red 28; C.I. Direct Orange 107 and C.I. Direct Red 81; C.I. Direct Orange 107 and C.I. Direct Red 2; or C.I. Direct Orange 107 and C.I. Direct Red 28.

The polyvinyl alcohol resin film may be allowed to absorb the dichroic dye in the oriented manner by a method comprising the steps of, for example, stretching the polyvinyl alcohol resin film and immersing the same in an aqueous solution of the dichroic dye.

The aqueous solution used for such an immersion treatment normally contains the dichroic dye in a concentration of about 0.0001 to about 1 part by weight per 100 parts by weight of water. Temperature of the aqueous solution during the immersion treatment usually ranges from about 30° C. to about 85° C., and preferably from about 60° C. to about 75° C. Incidentally, a dyeing assistant auxiliary may be added to the aqueous solution. When mirabilite ($Na_2SO_4$) is used as the dyeing assistant auxiliary, for example, an amount thereof to be used is about 0.5 to about 10 parts by weight per 100 parts by weight of water contained in the aqueous solution of the dichroic dye.

The polyvinyl alcohol resin film may be immersed in water prior to the immersion treatment for dying.

It is noted that the polyvinyl alcohol resin film may be stretched prior to, in the course of, or subsequent to the immersion treatment in the aqueous solution of the dichroic dye. The film is usually uniaxially stretched.

The present invention does not particularly limit the uniaxial film stretching method and both the wet film stretching method and the dry film stretching method can be used. As to a degree of stretching, the film can be stretched usually 4 times or more, and preferably from not less than 4 times to not more than 8 times, as large as an non-stretched film.

Examples of the dry method for uniaxially stretching the polyvinyl alcohol resin film include a method wherein the film is vertically and uniaxially oriented as brought into contact with heat rolls advancing the film as applying a rearward tension to the film, a method wherein the film is passed between a pair of heat rolls for compression stretching, and the like. The temperature of the heat rolls is usually higher than a glass transition temperature for the polyvinyl alcohol resin up to 160° C., and preferably in the range from about 80° C. to about 130° C.

In the above-described manner, the dichroic dye is absorbedly oriented in the polyvinyl alcohol resin film. The polyvinyl alcohol resin film with the absorbedly oriented dichroic dye is usually treated with boric acid.

The boric acid treatment is performed by immersing the film in an aqueous solution containing boric acid. The concentration of boric acid in the aqueous solution to be used is not particularly limited. Usually, the aqueous solution contains boric acid in a concentration of about 2 to about 15 parts by weight, and preferably of about 5 to about 12 parts by weight per 100 parts by weight of water in the solution.

During the boric acid treatment, the temperature of the aqueous solution containing boric acid is usually in the range of about 60° C. to about 85° C. and preferably of about 70° C. to about 80° C. Although not particularly limited, the treatment time usually ranges from about 100 to about 1200 seconds and preferably from about 150 to about 600 seconds.

After the boric acid treatment, the film may be rinsed with water and dried to obtain the light-polarizing film in the present invention.

The light-polarizing film thus obtained is usually provided with protective sheet(s) placed to its one or both sides for use as a light-polarizing plate. As the protective sheet, there may be used a protective sheet employed in a conventional light-polarizing plate. Examples of the protective sheet include cellulose acetate films, acrylic films, polyester films, polyolefin films, polycarbonate films, polyarylate films, polyether sulfone films and the like. Examples of the cellulose acetate films include triacetyl cellulose film, diacetyl cellulose film and the like. Although not particularly limited, the thickness of the protective sheet usually ranges from about 50 µm to about 200 µm.

The protective sheet may contain an ultraviolet absorbing agent and the like. A commercially available film may be used as such a protective sheet. Examples of the triacetyl cellulose film containing the ultraviolet absorbing agent include Conica UV80SHFN, Conica KC80UVSF, Conica KC80UVN (all manufactured by Conica Corp.) and the like.

The light-polarizing plate thus obtained may be provided with an antireflection processing on one or both sides of the light-polarizing film, or on one or both sides of the protective sheet. When provided with the antireflection processing, the light-polarizing plate preferably possesses a surface reflectance of not more than 1% and more preferably not more than 0.5% at wavelengths of from 430 to 500 nm. When the protective sheet(s) are placed on one or both sides of the light-polarizing film, the antireflection processing is provided onto the protective sheet.

The method of antireflection processing is not particularly limited. For example, there is a method wherein one or more layers of a material selected from inorganic substances such as metals and metal oxides and organic substances are placed on the surface of the light-polarizing film or the protective sheet for forming the antireflection layer.

Examples of the metals usable for antireflection processing include silver and the like. Examples of the metal oxides usable for antireflection processing include titanium oxide, silicon oxide, indium oxide, aluminum oxide, cesium oxide, tin oxide, zirconium oxide, yttrium oxide, tantalum oxide and the like. The usable inorganic substances other than these metals and metal oxides include, for example, magnesium fluoride and the like. Examples of the organic substances include fluororesins and the like.

Methods for placing the antireflective layer include Physical Vapor Deposition (PVD) Method such as vapor deposition, sputtering and ion plating, and coating methods such as roll coating, gravure coating and spray coating. The thickness of each antireflective layer is suitably selected so that the light-polarizing plate may possess a reflectance of not more than 1% and preferably of not more than 0.5% at wavelengths of from 430 to 500 nm inclusive. The surface of the protective sheet may be subjected to hard coating, corona treatment, chemical cleaning or the like for enhancement of adhesion between the antireflective layer and the protective sheet.

Such an antireflection processing may be provided on one side of the polarizing plate or on both sides thereof.

The light-polarizing film in the present invention can be used, for example, in such a light-polarizing plate which is preferably used in a liquid crystal panel for blue of a liquid crystal projector, while the projector comprises liquid crystal panels for the three primary colors.

In a case where the light-polarizing plate employing the light-polarizing film of the present invention is used for the liquid crystal panel, the light-polarizing plate may be provided on at least one side of a liquid crystal cell while a neutral-gray light-polarizing plate may be provided on the opposite side of the liquid crystal cell. However, it is preferred that the light-polarizing plate(s) with the light-polarizing film(s) of the present invention are provided on both sides of the liquid crystal cell. To provide the light-polarizing plate(s) on one or both sides of the liquid crystal cell, a transparent adhesive may be used to bond the light-polarizing plate to the liquid crystal cell. In this case, the light-polarizing plate may be adhesively bonded to the cell via another optical element. Examples of the transparent adhesive include pressure-sensitive adhesives (tackiness agent) such as acrylic pressure-sensitive adhesives and urethane pressure-sensitive adhesives. The light-polarizing plate maybe spaced from the liquid crystal cell in order to avoid a thermal influence from the light-polarizing film. In this case, the light-polarizing plate is used as bonded to a transparent substrate such as of glass sheet, polycarbonate sheet and acrylic sheet. Otherwise, the light-polarizing plate is used as bonded to an optical element (glass component) such as a plane-convex lens, cross dichroic prism and trimming filter. Alternatively, the light-polarizing plate may be bonded to a phase retarder plate.

The light-polarizing film of the present invention is most suited for use in the liquid crystal projector. When the film of the present invention may be used as the light-polarizing film for the light-polarizing plate of the liquid crystal panel for blue, despite the use of the neutral-gray light-polarizing films in the light-polarizing plates of the liquid crystal panels for red and green, the resulting liquid crystal projector displays images featuring bright and natural color tones as compared with images displayed by a liquid crystal projector employing the neutral-gray light-polarizing films for all the liquid crystal panels.

The present invention is described in more detail by following Examples, which should not be construed as a limitation upon the scope of the present invention.

Incidentally, a spectrophotometer UV2200 (commercially available from Shimadzu Corp.) was used for determinations of the transmittance of the light-polarizing film/plate at wavelengths of from 430 nm to 500 nm inclusive when the film was irradiated with the linearly polarized light with the vibration plane parallel to the absorption axis of the film; the transmittance of the light-polarizing film/plate at wavelengths of from 430 nm to 500 nm inclusive when the film was irradiated with the linearly polarized light with the vibration plane perpendicular to the absorption axis of the film; and the surface reflectance of the light-polarizing plate at wavelengths of from 430 nm to 500 nm inclusive.

EXAMPLE 1

A 75-$\mu$m thick film of polyvinyl alcohol having a polymerization degree of 2400 was uniaxially stretched (stretching temperature: about 120° C., degree of stretching: about 5 times) by a method which included the steps of bringing the film into contact with heat rolls advancing the film as applying a rearward tension thereto thereby vertically and uniaxially orienting the film, immersing the film held under tension in water at 54° C. for 60 seconds, and then immersing the film in an aqueous solution at 69° C. for 120 seconds, the solution containing water (100 parts by weight), C.I. Direct Orange 39 (0.022 part by weight), C.I. Direct Red 81 (0.018 part by weight) and mirabilite (2 parts by weight). Subsequently, the film was immersed in an aqueous solution at 74° C. for 300 seconds, the solution containing 100 parts by weight of water and 7.5 parts by weight of boric acid. Then, the film was rinsed with water and dried to obtain a light-polarizing film.

Figure 1:
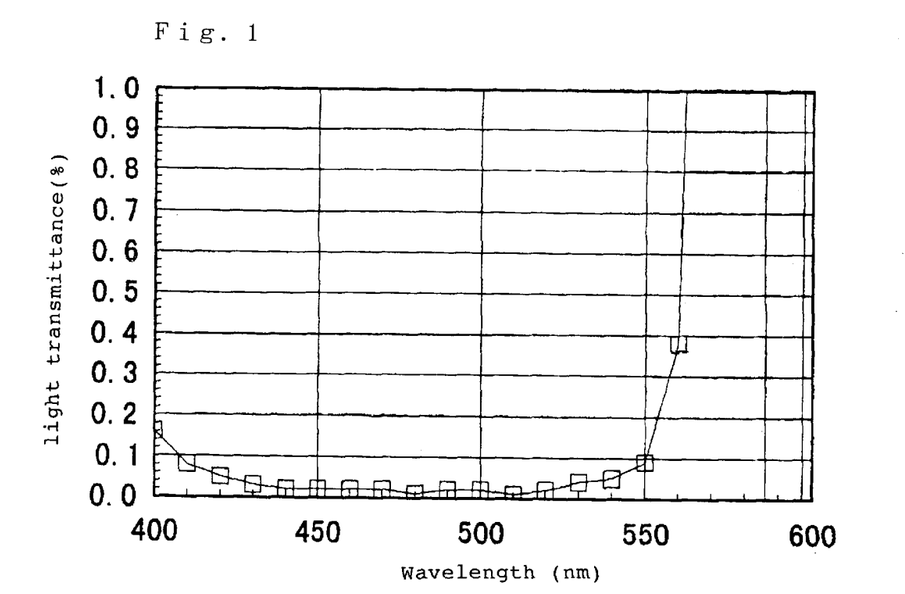
FIG. 1 represents a light-transmittance spectrum of a light-polarizing film of the present invention (a light-polarizing film obtained in the following Example 1) which is measured when irradiated with linearly polarized light with the vibration plane parallel to the absorption axis.
Figure 2:
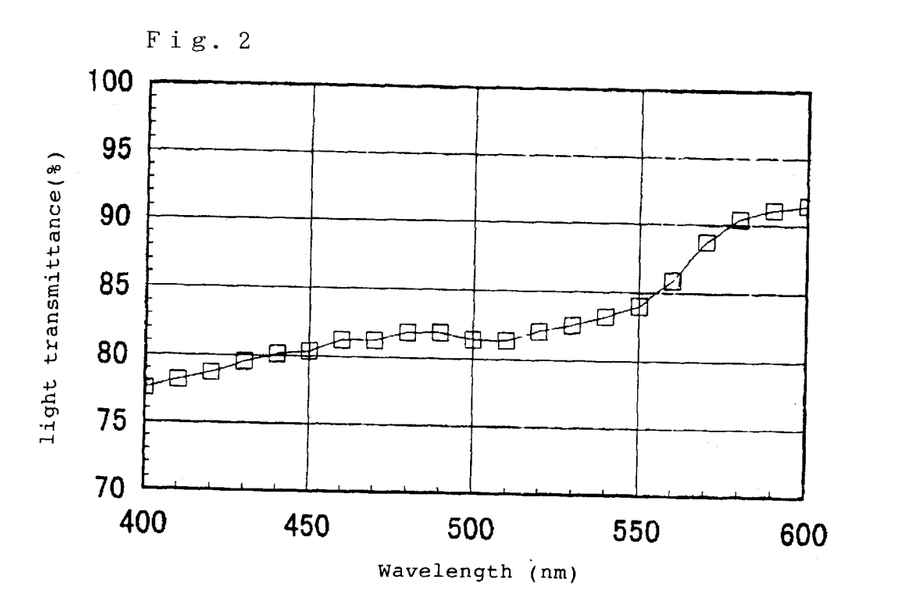
FIG. 2 represents a light-transmittance spectrum of the light-polarizing film of the present invention (the light-polarizing film obtained in the Example 1) which is measured when irradiated with linearly polarized light with the vibration plane perpendicular to the absorption axis.

The obtained light-polarizing film possessed a maximum light transmittance of 0.03% at wavelengths of from 430 nm to 500 nm inclusive when irradiated with the linearly polarized light with the vibration plane parallel to the absorption axis of the film. Further, the film possessed a minimum light transmittance of 79% at wavelengths of from 430 nm to 500 inclusive when irradiated with the linearly polarized light with the vibration plane perpendicular to the absorption axis. FIG. 1 represents a light-transmittance spectrum of the light-polarizing film irradiated with the linearly polarized light with the vibration plane parallel to the absorption axis. FIG. 2 represents a light-transmittance spectrum of the light-polarizing film irradiated with the linearly polarized light with the vibration plane perpendicular to the absorption axis.

EXAMPLE 2

The same procedure as in Example 1 was taken to obtain a light-polarizing film.

Triacetyl cellulose films (Conica KC80UVN manufactured by Conica Corp.) were bonded to both sides of the light-polarizing film thereby to obtain a light-polarizing plate.

Figure 3:
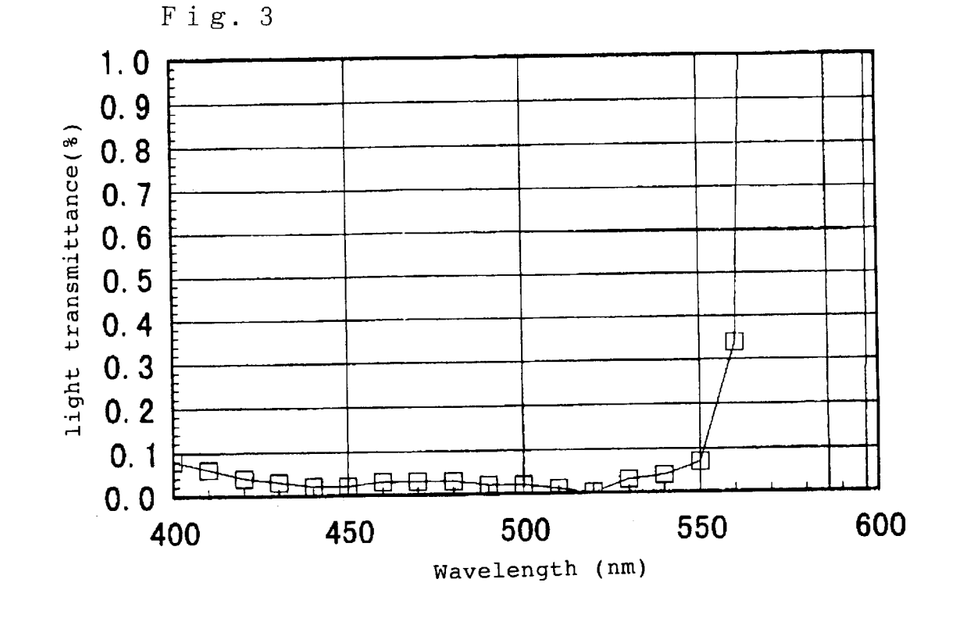
FIG. 3, FIG. 5 and FIG. 7 respectively represent light-transmittance spectra of light-polarizing plates of the present invention (light-polarizing plates respectively obtained in the following Example 2, Example 3 and Example 5) which are measured when irradiated with linearly polarized light with the vibration plane parallel to the absorption axis.
Figure 4:
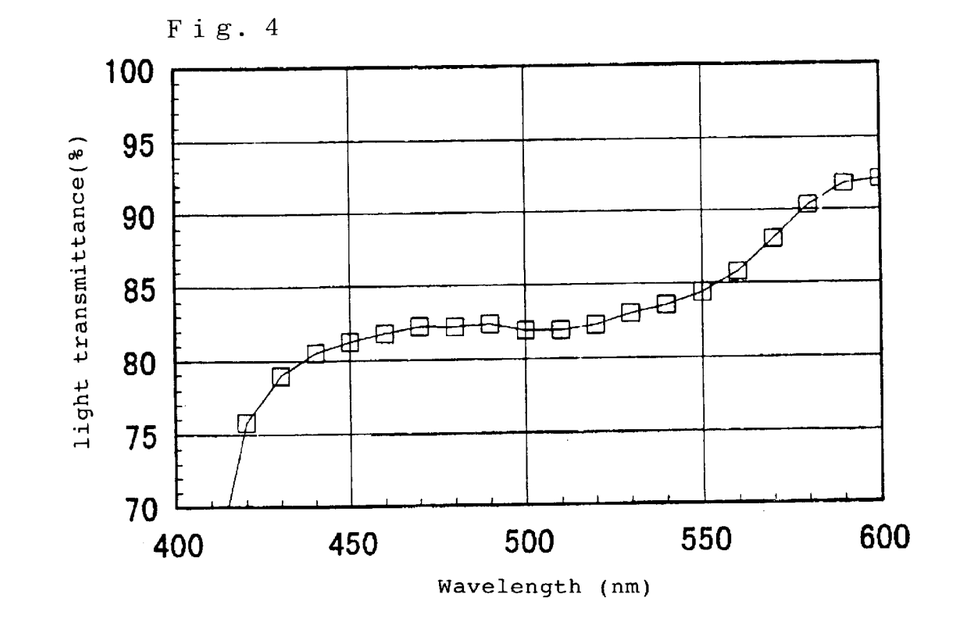
FIG. 4, FIG. 6 and FIG. 8 respectively represent light-transmittance spectra of the light-polarizing plates of the present invention (the light-polarizing plates respectively obtained in the Example 2, Example 3 and Example 5) which are measured when irradiated with linearly polarized light with the vibration plane perpendicular to the absorption axis.

The obtained light-polarizing plate possessed a light transmittance of not more than 0.03% at wavelengths of from 430 nm to 500 nm inclusive when irradiated with the linearly polarized light with the vibration plane parallel to the absorption axis. Further, the plate possessed a light transmittance of not less than 79% at wavelengths of from 430 nm to 500 nm inclusive when irradiated with the linearly polarized light with the vibration plane perpendicular to the absorption axis. FIG. 3 represents a light-transmittance spectrum of the light-polarizing plate irradiated with the linearly polarized light with the vibration plane parallel to the absorption axis. FIG. 4 represents a light-transmittance spectrum of the light-polarizing plate irradiated with the linearly polarized light with the vibration plane perpendicular to the absorption axis.

A liquid crystal projector was fabricated using the neutral-gray light-polarizing plates for the liquid crystal panels for red and green, and the light-polarizing plate of Example 2 for the liquid crystal panel for blue. In each liquid crystal panel, the light-polarizing plates were respectively placed on glass components and were then disposed on the both sides of the liquid crystal cell, as spaced from the liquid crystal cell. The obtained liquid crystal projector displayed images which featured natural color tones as compared with those displayed by a liquid crystal projector wherein for all the liquid crystal panels, the neutral-gray light-polarizing plates were used.

EXAMPLE 3

A 5-$\mu$m thick film of polyvinyl alcohol having a polymerization degree of 4000 was uniaxially stretched (stretching temperature: about 100° C., degree of stretching: about 4 times) by a method which included the steps of bringing the film into contact with the heat rolls advancing the film as applying the rearward tension thereto thereby vertically and uniaxially orienting the film, immersing the film held under tension in water at 60° C. for 60 seconds, and then immersing the film in an aqueous solution at 70° C. for 215 seconds, the solution containing water (100 parts by weight), C.I. Direct Orange 39 (0.025 part by weight), C.I. Direct Red 81 (0.010 part by weight) and mirabilite salt (2 parts by weight). Subsequently, the film was immersed in the aqueous solution at 78° C. for 300 seconds, the solution containing 100 parts by weight of water and 7.5 parts by weight of boric acid. Then, the film was rinsed with water and dried to obtain a light-polarizing film.

Triacetyl cellulose films (Conica KC80UVN manufactured by Conica Corp.) were bonded to both sides of the light-polarizing film thereby to obtain a light-polarizing plate.

Figure 5:
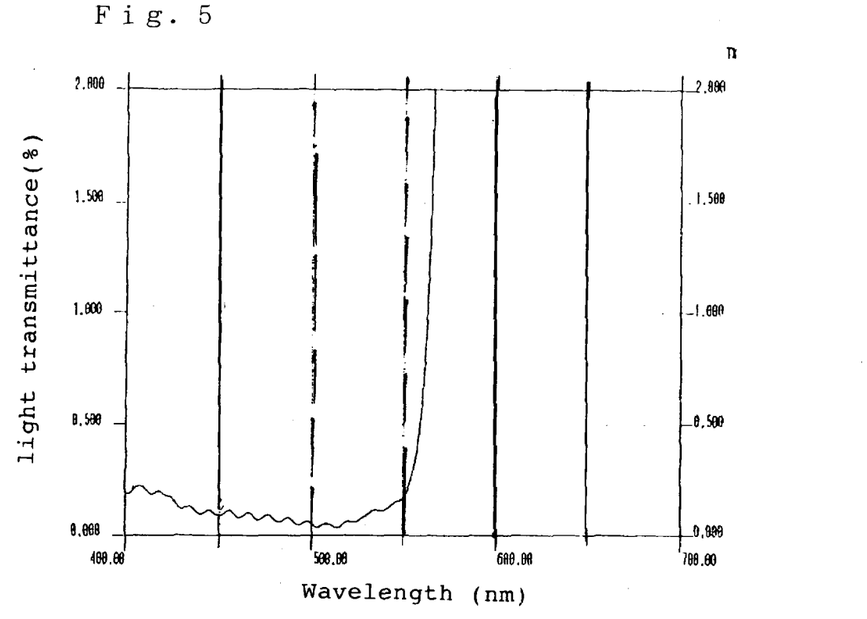
Figure 6:
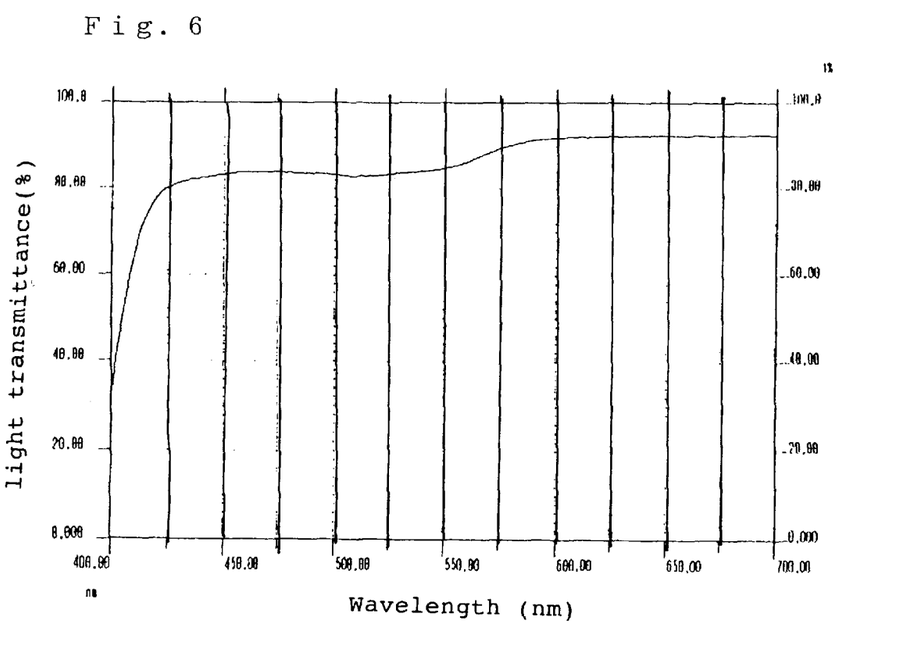

The obtained light-polarizing plate possessed a maximum light transmittance of 0.15% at wavelengths of from 430 nm to 500 nm inclusive when irradiated with the linearly polarized light with the vibration plane parallel to the absorption axis. Further, the plate possessed a minimum light transmittance of 82% at wavelengths of from 430 nm to 500 nm inclusive when irradiated with the linearly polarized light with the vibration plane perpendicular to the absorption axis. FIG. 5 represents a light-transmittance spectrum of the light-polarizing plate irradiated with the linearly polarized light with the vibration plane parallel to the absorption axis. FIG. 6 represents a light-transmittance spectrum of the light-polarizing plate irradiated with the linearly polarized light with the vibration plane perpendicular to the absorption axis.

A liquid crystal projector was fabricated using the neutral-gray light-polarizing plates for the liquid crystal panels for red and green, and the light-polarizing plate of Example 3 for the liquid crystal panel for blue. In each liquid crystal panel, the light-polarizing plates were respectively placed on glass components and were then disposed on the both sides of the liquid crystal cell, as spaced from the liquid crystal cell. The obtained liquid crystal projector displayed images which featured natural color tones as compared with those displayed by a liquid crystal projector wherein for all the liquid crystal panels, the neutral-gray light-polarizing plates were used.

EXAMPLE 4

The same procedure as in Example 3 was taken to obtain a light-polarizing plate except that a 75-μm thick film of polyvinyl alcohol having a polimerization degree of 2400 was used, instead of the 5-μm thick film of polyvinyl alcohol having a polymerization degree of 4000. The obtained light-polarizing plate possessed a light transmittance of not more than 0.3% at wavelengths of from 430 to 500 nm inclusive when irradiated with the linearly polarized light with the vibration plane parallel to the absorption axis. Further, the plate possessed a light transmittance of not less than 80% at wavelengths of from 430 to 500 nm inclusive when irradiated with the linearly polarized light perpendicular to the absorption axis.

A liquid crystal projector was fabricated using the neutral-gray light-polarizing plates for the liquid crystal panels for red and green, and the light-polarizing plate of Example 4 for the liquid crystal panel for blue. In each liquid crystal panel, the light-polarizing plates were respectively placed on glass components and were then disposed on the both sides of the liquid crystal cell, as spaced from the liquid crystal cell. The obtained liquid crystal projector displayed images which featured natural color tones as compared with those displayed by a liquid crystal projector wherein for all the liquid crystal panels, the neutral-gray light-polarizing plates were used.

EXAMPLE 5

A 75-μm thick film of polyvinyl alcohol having the polymerization degree of 2400 was uniaxially stretched (stretching temperature: about 120° C., degree of stretching: about 5 times) by a method which included the steps of bringing the film into contact with the heat rolls advancing the film as applying the rearward tension thereto thereby vertically and uniaxially orienting the film, immersing the film held under tension in water at 54° C. for 60 seconds, and then immersing the film in an aqueous solution at 69° C. for 120 seconds, the solution containing water (100 parts by weight), C.I. Direct Orange 39 (0.021 part by weight), C.I. Direct Red 81 (0.008 part by weight) and mirabilite (2 parts by weight). Subsequently, the film was immersed in an aqueous solution at 75° C. for 300 seconds, the solution containing 100 parts by weight of water and 7.5 parts by weight of boric acid. Then, the film was rinsed with water and dried to obtain a light-polarizing film.

Triacetyl cellulose films (Conica KC80UVN manufactured by Conica Corp.) were bonded to both sides of the light-polarizing film thereby to obtain a light-polarizing plate.

The obtained light-polarizing plate possessed a light transmittance of not more than 0.13% at wavelengths of from 430 to 500 nm inclusive when irradiated with the linearly polarized light with the vibration plane parallel to the absorption axis. Further, the plate possessed a light transmittance of not less than 82.2% at wavelengths of from 430 to 500 nm inclusive when irradiated with the linearly polarized light with the vibration plane perpendicular to the absorption axis. The light-polarizing plate had a surface reflectance of not more than 0.5% at wavelengths of from 430 to 500 nm inclusive.

Figure 7:
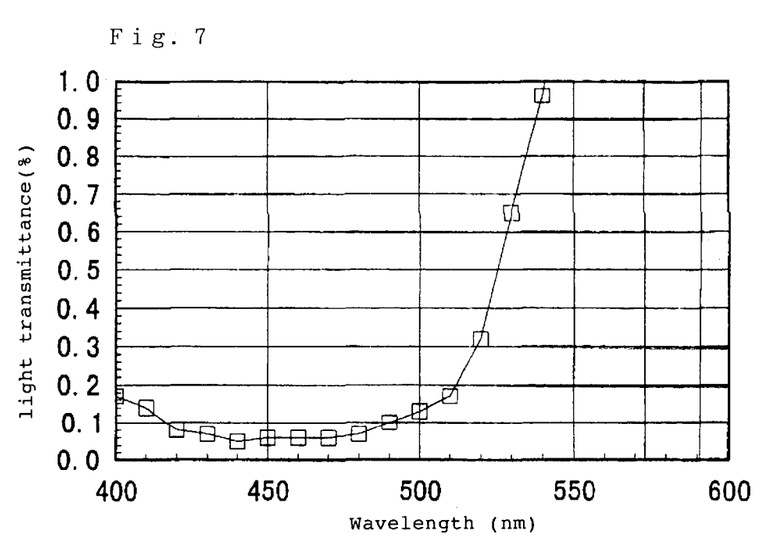
Figure 8:
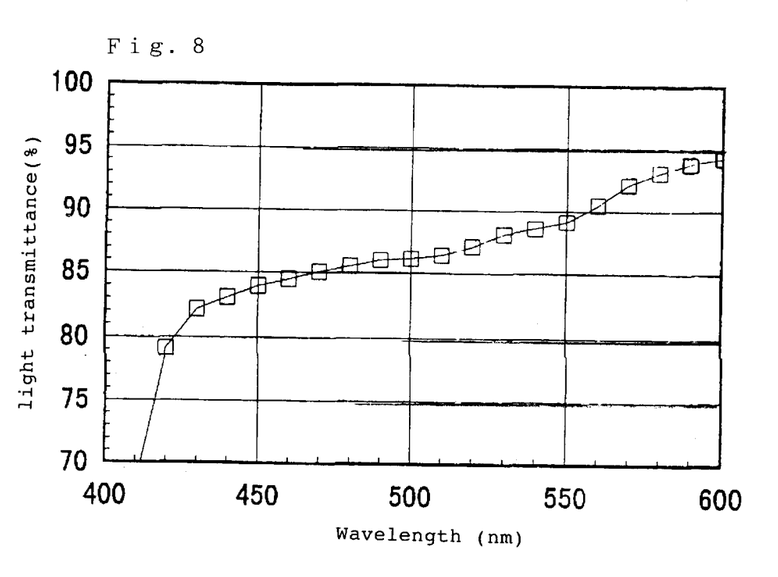
Figure 9:
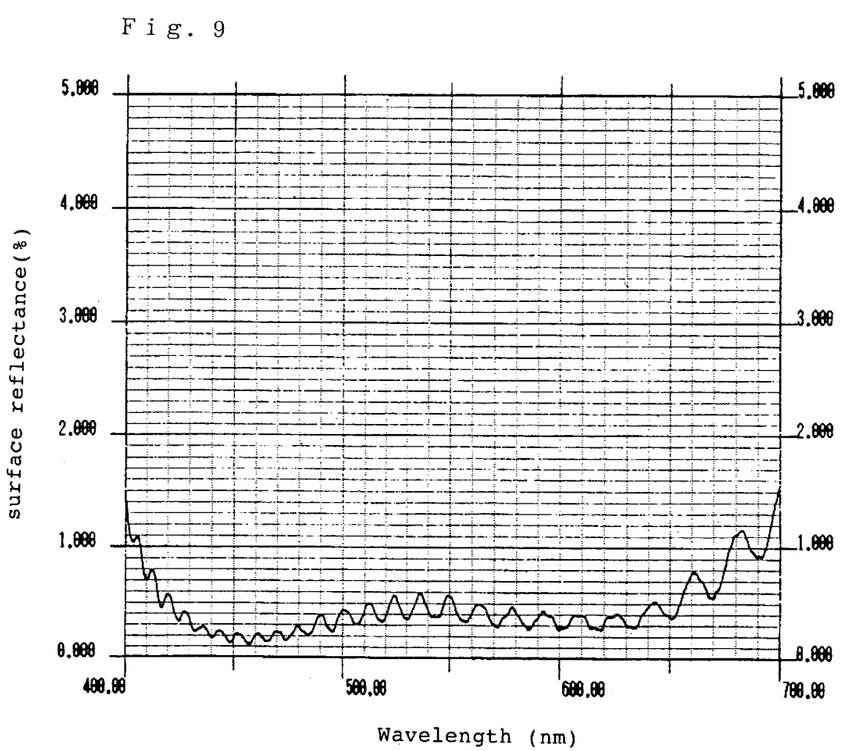
FIG. 9 represents a reflectance spectrum of the light-polarizing plate of the present invention (the light-polarizing plate obtained in the Example 5).

FIG. 7 represents a light-transmittance spectrum of the light-polarizing plate irradiated with the linearly polarized light with the vibration plane parallel to the absorption axis of the plate. FIG. 8 represents a light-transmittance spectrum of the light-polarizing plate irradiated with the linearly polarized light with the vibration plane perpendicular to the absorption axis. FIG. 9 represents a reflectance spectrum of the light-polarizing plate.

A liquid crystal projector was fabricated using the neutral-gray light-polarizing plates for the liquid crystal panels for red and green, and the light-polarizing plate of Example 5 for the liquid crystal panel for blue. In each liquid crystal panel, the light-polarizing plates were respectively placed on glass components and were then disposed on the both sides of the liquid crystal cell, as spaced from the liquid crystal cell. The obtained liquid crystal projector displayed images which featured natural color tones as compared with those displayed by a liquid crystal projector wherein for all the liquid crystal panels, the neutral-gray light-polarizing plates were used.

What is claimed is:

1. A light-polarizing film processing a dichroic dye and having a light transmittance of not more than 0.3% at wavelengths of from 430 nm to 500 nm inclusive when irradiated with a linearly polarized light with a vibration plane parallel to an absorption axis of said film, and a light transmittance of not less than 77% at wavelengths of from 430 nm to 500 nm nm inclusive when irradiated with a linearly polarized light with a vibration plane perpendicular to the absorption axis of said film, wherein the dichroic dye comprises any one of the combinations of: C.I. Direct Orange 39 and C.I. Direct Red 81; C.I. Direct Orange 39 and C.I. Direct Red 2; C.I. Direct Orange 39 and C.I. Direct Red 28; C.I. Direct Orange 107 and C.I. Direct Red 81; C.I. Direct Orange 107 and C.I. Direct Red 2; and C.I. Direct Orange 107 and C.I. Direct Red 28.

2. A light-polarizing film possessing a light transmittance of not more than 0.3% at wavelengths of from 430 nm to 500 nm inclusive when irradiated with a linearly polarized light with a vibration plane parallel to an absorption axis, a light transmittance of not less than 77% at wavelengths of from 430 nm to 500 nm inclusive when irradiated with a linearly polarized light with a vibration plane perpendicular to the absorption axis, and a surface reflectance of not more than 1% at wavelengths of from 430 nm to 500 nm inclusive, which comprises a light-polarizing film and a protective sheet, wherein the light-polarizing film is obtained by absorbedly orienting a dichroic dye in a polyvinyl alcohol resin film, and wherein the dichroic dye comprises any one of the combinations of: C.I. Direct Orange 39 and C.I. Direct Red 81; C.I. Direct Orange 39 and C.I. Direct Red 2; C.I. Direct Orange 39 and C.I. Direct Red 28; C.I. Direct Orange 107 and C.I. Direct Red 81; C.I. Direct Orange 107 and C.I. Direct Red 2; C.I. Direct Orange 107 and C.I. Direct Red 28.

* * * * *